(12) United States Patent
Baeck et al.

(10) Patent No.: US 9,401,516 B2
(45) Date of Patent: Jul. 26, 2016

(54) FUEL CELL

(71) Applicant: Hyundai Motor Company, Seoul (KR)

(72) Inventors: Suk Min Baeck, Gyeonggi-do (KR); Sang Mun Jin, Gyeonggi-do (KR); Kyung Min Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 128 days.

(21) Appl. No.: 14/288,926

(22) Filed: May 28, 2014

(65) Prior Publication Data

US 2015/0180054 A1 Jun. 25, 2015

(30) Foreign Application Priority Data

Dec. 20, 2013 (KR) ........................ 10-2013-0160186

(51) Int. Cl.
*H01M 8/02* (2016.01)
*H01M 8/10* (2016.01)

(52) U.S. Cl.
CPC .......... *H01M 8/0273* (2013.01); *H01M 8/1004* (2013.01); *H01M 2008/1095* (2013.01); *Y02E 60/521* (2013.01)

(58) Field of Classification Search
CPC ................... H01M 2008/1095; H01M 8/0273; H01M 8/0276; H01M 8/1004
See application file for complete search history.

(56) References Cited

U.S. PATENT DOCUMENTS

| 2004/0096730 A1* | 5/2004 | Kuroki | H01M 4/8605 429/509 |
| 2006/0142039 A1* | 6/2006 | Debe | H01M 8/0284 455/522 |
| 2009/0136811 A1* | 5/2009 | Kusakabe | H01M 8/0273 429/492 |

FOREIGN PATENT DOCUMENTS

| JP | 2007-184212 A | 7/2007 |
| JP | 2010-165635 A | 7/2010 |
| JP | 2011023161 A | 2/2011 |
| JP | 2011192584 A | 9/2011 |
| JP | 2012054118 A | 3/2012 |
| KR | 10-2004-0028777 A | 4/2004 |
| KR | 10-2012-0036888 | 4/2012 |
| KR | 10-2012-0063300 A | 6/2012 |

* cited by examiner

*Primary Examiner* — Carlos Barcena
(74) *Attorney, Agent, or Firm* — Mintz Levin Cohn Ferris Glovsky and Popeo, P.C.; Peter F. Corless

(57) ABSTRACT

A fuel cell that includes a membrane electrode assembly having an electrolyte, an anode catalyst, and a cathode catalyst; and a plurality of frame-gaskets is provided. Each of the frame-gaskets may be disposed between an anode-side separator and the membrane electrode assembly or between a cathode-side separator and the membrane electrode assembly. Additionally, the membrane electrode assembly is provided with an aperture which is used to combine the membrane electrode assembly with the frame-gasket assembly.

6 Claims, 5 Drawing Sheets

FUEL CELL

CROSS REFERENCE TO RELATED APPLICATION

The present application claims priority of Korean Patent Application Number 10-2013-0160186 filed Dec. 20, 2013, the entire contents of which application is incorporated herein for all purposes by this reference.

BACKGROUND OF THE INVENTION

1. Field of the Invention

The present invention relates to a fuel cell, and more particularly to a technology to integrate a gasket-combined frame inside a fuel cell, a separator, and a membrane electrode assembly.

2. Description of the Related Art

A fuel cell stack generally includes an anode, a cathode, and a solid polymer electrolyte membrane disposed between the anode and cathode. Fuel cells power a load with power generated by chemical reaction between an oxidant (e.g., oxygen in air) supplied to the cathode and a fuel (e.g., hydrogen) supplied to the anode.

A unit cell of a fuel cell typically has a structure in which a cathode-side separator supplied with an oxidation gas, an anode-side separator supplied with a reduction gas, and a polymer electrolyte membrane, and a gas diffusion layer are stacked together to form a fuel cell stack. The unit cells are often stacked in a vertical direction and fixed together to form such a fuel cell stack.

In particular, a separator is provided in between each of the units of the fuel cell stack in order operated the fuel cell stack effectively. These separators perform multiple functions. For example, the separator functions as a fuel-oxidant supply passage to supply the oxidant (often air) to the cathode and the fuel to (often hydrogen) the anode in the fuel cell stack. Also provided in the separator are both a coolant supply passage to cool the fuel cell stack, and a current passage to transmit electric current therethrough.

Given multi-faceted nature of the separator, it is required to have gas tight and liquid tight seal around each of the passages therein so that fuel, oxidant, and coolant cannot be mixed. In order to ensure a liquid tight and gas tight seal in between the sections of the separator, a gasket made of rubber is arranged on the surface of the separator. This gasket functions to maintain surface pressure and seal each of the passages.

FIGS. 1 and 2 illustrate a conventional unit cell 500 including separators 520, membrane electrode assemblies (MEAs) 510, and gaskets 530 disposed between the separators 520 and the MEAs 510. In order to produce this structure, an adhesive is spread on the separators 520 and then fluorine-based gaskets 530 are produced through injection molding.

A manufacturing method for the separator 520 includes (a) providing materials, (b) molding (stamping) a fluid channel, (c) performing surface treatment to form a conductive surface, and (d) performing injection molding to produce an integrated gasket. Each of these steps is sequentially performed. The integrated gasket 530 of the separator is produced in a manner that an injection gasket mold holds an edge portion of the separator 520 at a predetermined pressure and a pressurized injection molding process using a gasket material is performed on the surface of the separator 520.

When the material of the gasket leaks through a gap between the separator 520 and the mold of the gasket during the injection molding, the leaked material forms burrs in the openings/passages. In this case, a deburring process is performed to remove the burrs. However, the surface of the separator 520 is susceptible to physical damage as well during the deburring process, increasing a defect rate of the separators.

Additionally, when multiple unit cells 500 are stacked to form a fuel cell stack, a reference point for stacking is needed. The degree of alignment between the separators 520 and the degree of alignment between the separator 520 and the MEA 510 are determined based on the reference point. When misalignment between the separator 520 and the MEA 510 occurs, the gas diffusion layer (GDL) adjacent to the MEA 510 is also misaligned with respect to the separator 520. In this case, the GDL layer disposed on the separator 520 is misaligned and the GDL layer blocks passages of reaction gases, lowering distribution of the reaction gases. This results in a decrease in the performance of the unit cell 500.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a fuel cell which improves alignment of the parts by using an assembly in which a separator, a gasket, and a membrane electrode assembly are integrated into a single body thereby avoiding misalignment during by having to adhere the three components together.

According to one aspect, there is provided a fuel cell including: a membrane electrode assembly including an electrolyte, an anode catalyst, and a cathode catalyst; and a plurality of frame-gaskets, each being disposed between an anode-side separator and the membrane electrode assembly or between a cathode-side separator and the membrane electrode assembly. In particular, the membrane electrode assembly is provided with an aperture which enables the membrane electrode assembly to be integrated (as a single continuous body) with the frame-gasket assembly.

As such, the frame-gaskets may include a first frame-gasket made up of an anode-side frame and an anode-side gasket, and a second frame-gasket made up of a cathode-side frame and a cathode-side gasket. One of the frame-gaskets may have a concave portion, and a position of the concave portion of the frame-gasket may correspond to a position of the aperture of the membrane electrode assembly. Additionally, any one of the frame-gaskets other than the frame-gasket provided with the concave portion may have a convex portion to be engaged with the concave portion.

As such, a cross section of the convex portion may be a polygonal shape in some exemplary embodiments of the present invention, and a portion of the convex portion to be engaged with the concave portion may have a bulging portion in some exemplary embodiments of the present invention.

Alternatively, each of these frame-gaskets in the exemplary embodiments of the present invention may have a plurality of concave portions and a plurality of concave portions corresponding to the plurality of concave portions, and outer and inner diameters of pairs of the concave portions and the convex portions may vary from pair to pair.

Furthermore, a fuel cell according to the exemplary embodiments of the present invention has the following advantages. First, injection-molded frame-gaskets and membrane electrode assemblies are separately manufactured and then integrated as a single contiguous piece without using an adhesive. Accordingly, a manufacturing method thereof is simple and the error/defect rate resulting from positional misalignment between the membrane electrode assemblies when stacking unit cells is prevented.

Second, it is possible to dramatically facilitate handling of the membrane electrode assembly which is not a rigid body.

Third, since a degree of positional alignment between a membrane electrode assembly and a gas diffusion layer is increased, the gas diffusion layer can be precisely and accurately positioned on fluid channels of a separator in a unit cell of a fuel cell, improving distribution of reaction gases.

Finally, since the location is the membrane electrode assembly is fixed, there is no interference with a stacking reference tool. Accordingly, process efficiency is improved and the defect rate is reduced.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
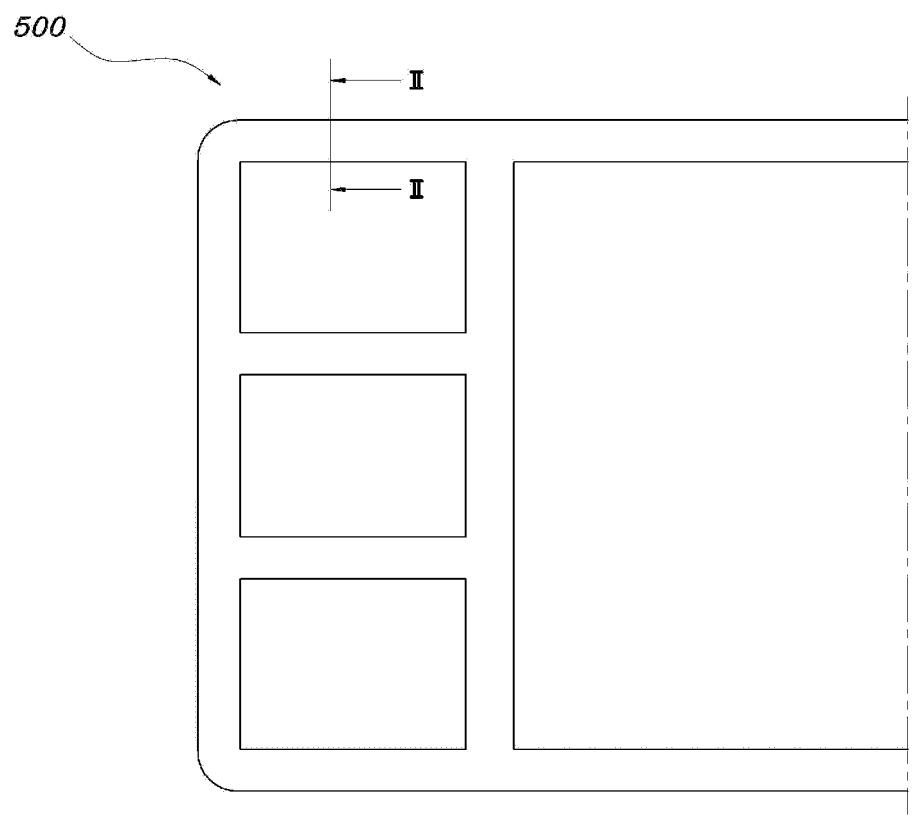
FIG. 1 is a diagram illustrating a unit cell of a fuel cell according to a conventional art.
Figure 2:
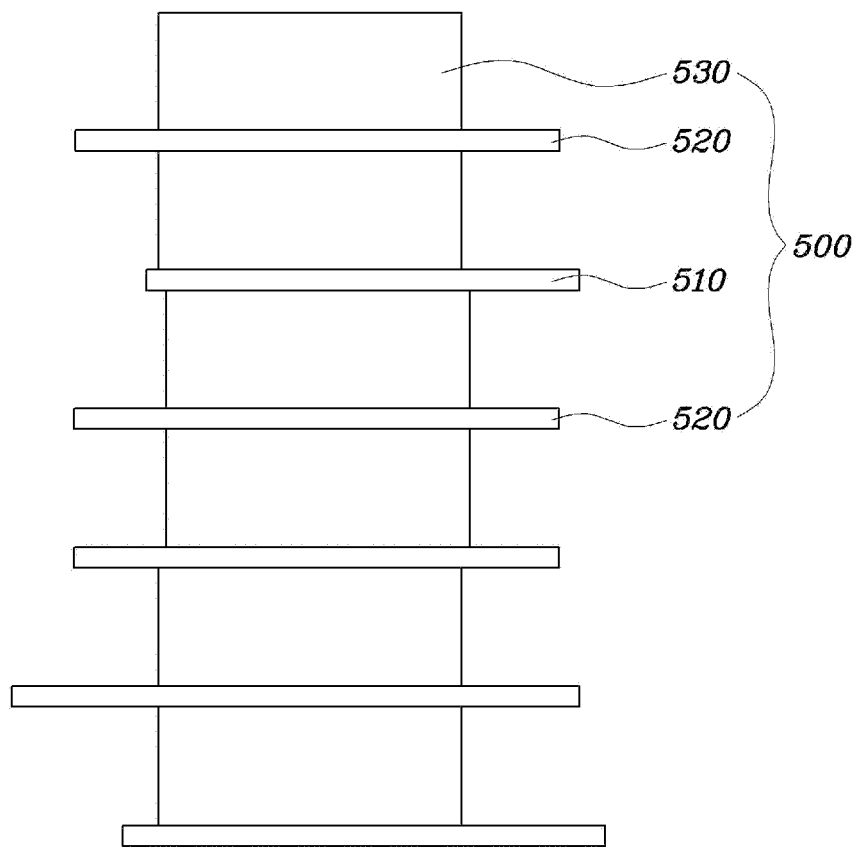
FIG. 2 is a cross-sectional view taken along line II-II.

Hereinbelow, preferred embodiments of the present invention will be described in detail with reference to the accompanying drawings.

Specific structural and functional descriptions of exemplary embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various exemplary embodiments of the present invention, specific examples of which are illustrated in the accompanying drawings and described below, since the exemplary embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

Figure 3:
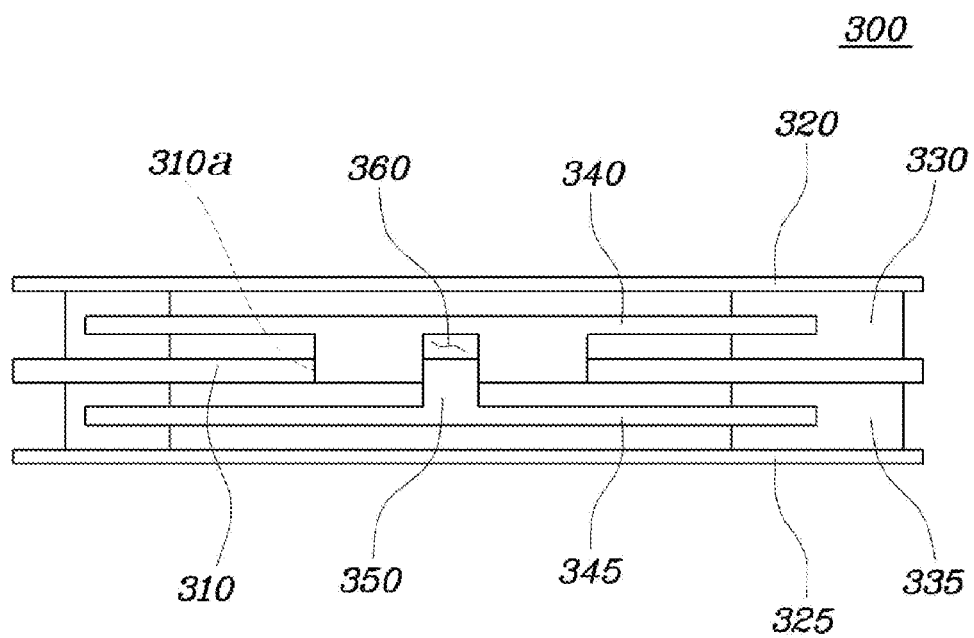
FIG. 3 is a diagram illustrating an inside structure of a fuel cell according to one exemplary embodiment of the present invention.
Figure 4:
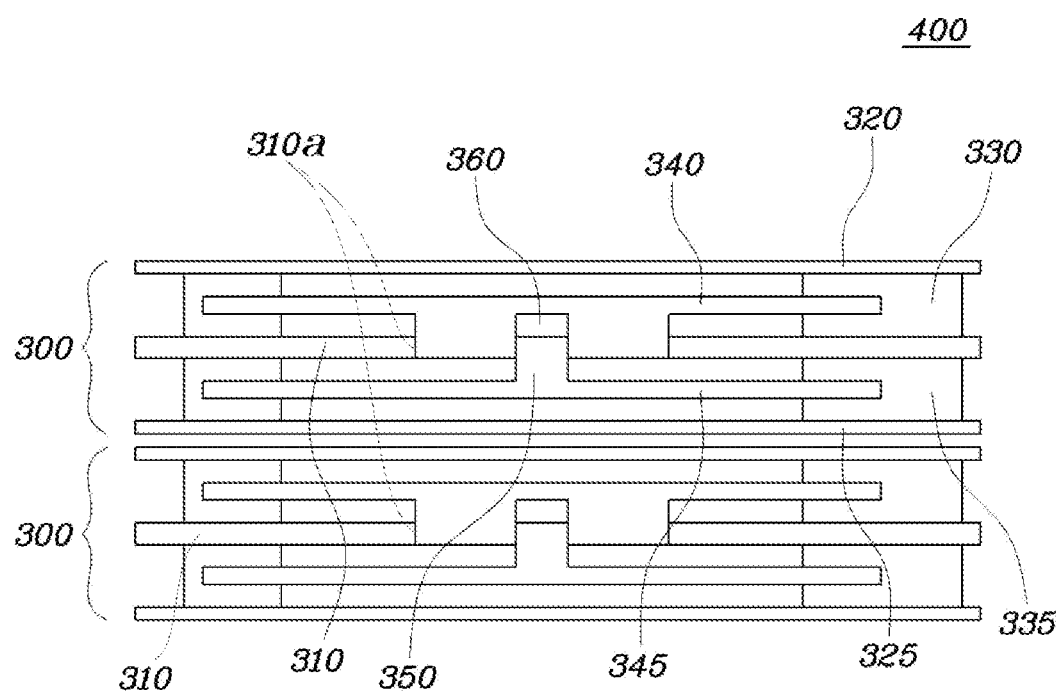
FIG. 4 is a diagram illustrating a fuel cell stack in which unit cells of a fuel cell are stacked, according to one exemplary embodiment of the present invention.

FIG. 3 is a diagram illustrating an inside structure of a fuel cell according to one exemplary embodiment of the present invention. FIG. 4 is a diagram illustrating a fuel cell stack in which unit cells of a fuel cell are stacked according to the one exemplary embodiment.

With reference to FIGS. 3 and 4, a fuel cell 300 according to one exemplary embodiment of the present invention includes an MEA 310, an anode-side separator 320, a cathode-side separator 325, an anode-side gasket 330, a cathode-side gasket 335, an anode-side frame 340, a cathode-side frame 345, a convex portion 350, and a concave portion 360.

The MEA 310 in the exemplary embodiment of the present invention may include for example an electrolyte, an anode, and a cathode, and has apertures 310a which enable the MEA 310 to be combined with frame-gaskets 330-340 and 335-345. The frames 340 and 345 and the gaskets 330 and 335 are shown as being integrated as single contiguous unit to form the frame-gaskets 330-340 and 335-345. The multiple frame-gaskets 330-340 and 335-345 are integrated with the anode-side separator 320 and the cathode-side separator 325, respectively. That is, the anode-side frame 340 and the anode-side gasket 330 are integrated to form a single assembly, and this assembly can be disposed between the MEA 310 and the anode-side separator 320. The cathode-side frame 345 and the cathode-side gasket 335 are integrated to form a single assembly, and this assembly can be disposed between the MEA 310 and the cathode-side separator 325.

Any one frame-gasket of the plurality of frame-gaskets may have a concave portion 360. The position of the concave portion 360 corresponds to the position of the apertures 310a of the MEA 310. In such an embodiment, any other frame-gaskets other than the frame-gasket with the concave portion 360 may have convex portions 350 to be inserted into the apertures 310a.

The cross section of the convex portion 350 has a rectangular shape which is a general concave-convex shape, a trapezoidal shape which enables easy molding, a cone shape which enables easy alignment when stacked, and a convex shape which can be easily engaged with a concave shape. When the cross section of a portion of the convex portion 350 to be engaged with the concave portion 360 is a protruding curve, this cross section of the engaged portion of the concave portion 360 may have a corresponding recessed curve.

The apertures 310a of the MEA 310, and coupling structures to couple the convex portion 350 and the concave portion 360 are present in at least a pair (i.e., two corresponding portions) and arranged between the frame-gaskets and the MEA 310. When the convex portion 350 and the concave portion 360 are press-fitted, there should be no interferences during manufacture.

The frames 340 and 345 may be made from a plastic material with good flowability which can be easily molded, such as Liquid Crystal Polymer (LCP). The plurality of frame-gaskets has a plurality of concave portions 360 and a plurality of convex portions 350 corresponding to the plurality of concave portions 360. Outer diameters and inner diameters of pairs of the concave portions 360 and the convex portions 350 may vary depending on the pairs of the concave portions 360 and the convex portions 350. Accordingly, it is possible to prevent abnormal engagement between the convex portions 350 and the concave portions 360. FIG. 4 illustrates a fuel cell stack 400 in which the fuel cells 300 shown in FIG. 3 are stacked and combined with each other.

Figure 5:
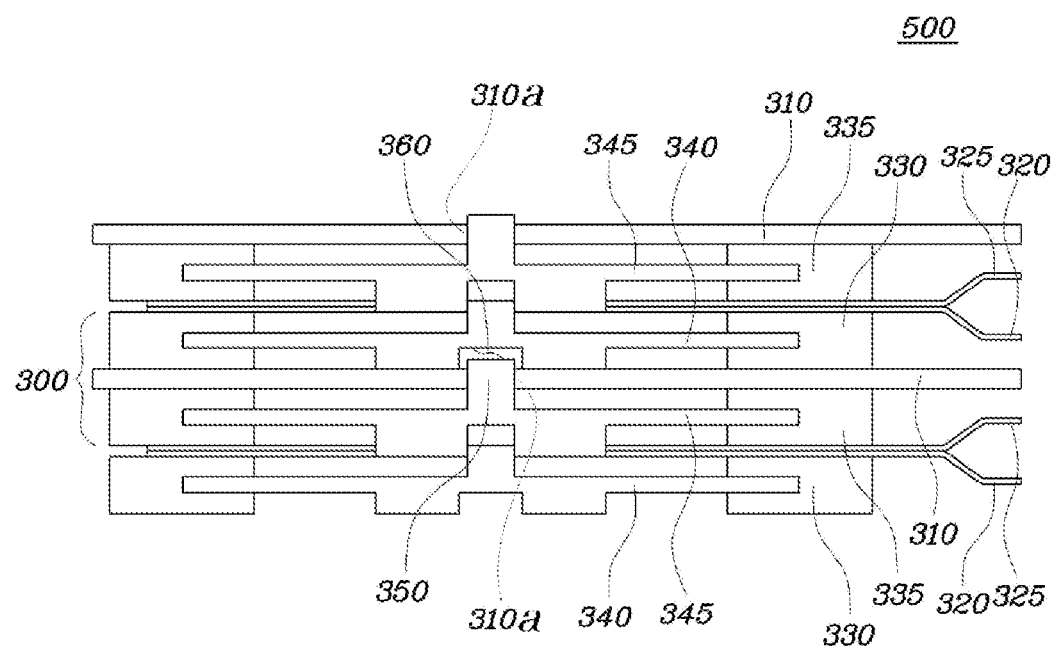
FIG. 5 is a diagram illustrating a fuel cell stack according to another exemplary embodiment of the present invention.

FIG. 5 is a diagram illustrating a fuel cell stack according to another exemplary embodiment of the present invention. In the center of FIG. 5, a unit cell 300 is illustrated. MEAs 310 of other units cells are illustrated above and below the unit cell 300. This unit cell 300 in FIG. 5 is different from the unit cell 300 in FIGS. 3 and 4 in that an anode-side frame 340 is provided with an additional concave portion and a cathode-side frame 345 is provided with an additional convex portion so that they can be combined and alignment even more accurately when forming a fuel cell stack 500 by stacking the units cells 300.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fuel cell comprising:
    a membrane electrode assembly including an electrolyte, an anode catalyst, and a cathode catalyst; and
    a plurality of frame-gaskets, each frame-gasket of the plurality of frame-gaskets being disposed between an anode-side separator and the membrane electrode assembly or between a cathode-side separator and the membrane electrode assembly,
    wherein the membrane electrode assembly is provided with an aperture which allows the membrane electrode assembly to be integrated with the frame-gasket,
    wherein the frame-gaskets include a first frame-gasket made up of an anode-side frame and an anode-side gasket and a second frame-gasket made up of a cathode-side frame and a cathode-side gasket,
    wherein any one of the anode-side frame and the cathode-side frame has a concave portion, and a position of the concave portion corresponds to a position of the aperture of the membrane electrode assembly, and
    wherein any one of the frames other than the frame with the concave portion has a convex portion to be engaged with the concave portion.

2. The fuel cell according to claim 1, wherein a cross section of the convex portion is a polygonal shape, and a portion of the convex portion to be engaged with the concave portion has a bulging portion.

3. The fuel cell according to claim 1, wherein each of the frame-gaskets has a plurality of concave portions and a plurality of concave portions corresponding to the plurality of concave portions, and outer and inner diameters of pairs of the concave portions and the convex portions vary from pair to pair.

4. A fuel cell comprising:
    a membrane electrode assembly (MEA) including an electrolyte, an anode catalyst, a cathode catalyst and at least one aperture; and
    a plurality of frame-gaskets, each of the plurality of frame-gaskets being disposed between an anode-side separator and the membrane electrode assembly or between a cathode-side separator and the membrane electrode assembly,
    wherein each of the frame-gaskets includes at least two frames and at least two gaskets integrated as single contiguous unit to form each frame-gaskets having portions that are inserted into at least one aperture of the MEA,
    wherein the frame-gaskets include a first frame-gasket made up of an anode-side frame and an anode-side gasket and a second frame-gasket made up of a cathode-side frame and a cathode-side gasket,
    wherein any one of the anode-side frame and the cathode-side frame has a concave portion, and a position of the concave portion corresponds to a position of the aperture of the membrane electrode assembly, and
    wherein any one of the frames other than the frame with the concave portion has a convex portion to be engaged with the concave portion.

5. The fuel cell according to claim 4, wherein a cross section of the convex portion is a polygonal shape, and a portion of the convex portion to be engaged with the concave portion has a bulging portion.

6. The fuel cell according to claim 4, wherein each of the frame-gaskets has a plurality of concave portions and a plurality of concave portions corresponding to the plurality of concave portions, and outer and inner diameters of pairs of the concave portions and the convex portions vary from pair to pair.

* * * * *